July 25, 1950 O. G. CULPEPPER 2,516,680
APPARATUS FOR REMOVING IMPURITIES FROM AIR
Filed May 11, 1945 6 Sheets-Sheet 1

Inventor
OLIVER G. CULPEPPER
BY *Paul Eaton*
ATTORNEY

July 25, 1950          O. G. CULPEPPER          2,516,680

APPARATUS FOR REMOVING IMPURITIES FROM AIR

Filed May 11, 1945          6 Sheets-Sheet 3

Inventor
OLIVER G. CULPEPPER
By Paul B. Eaton
ATTORNEY

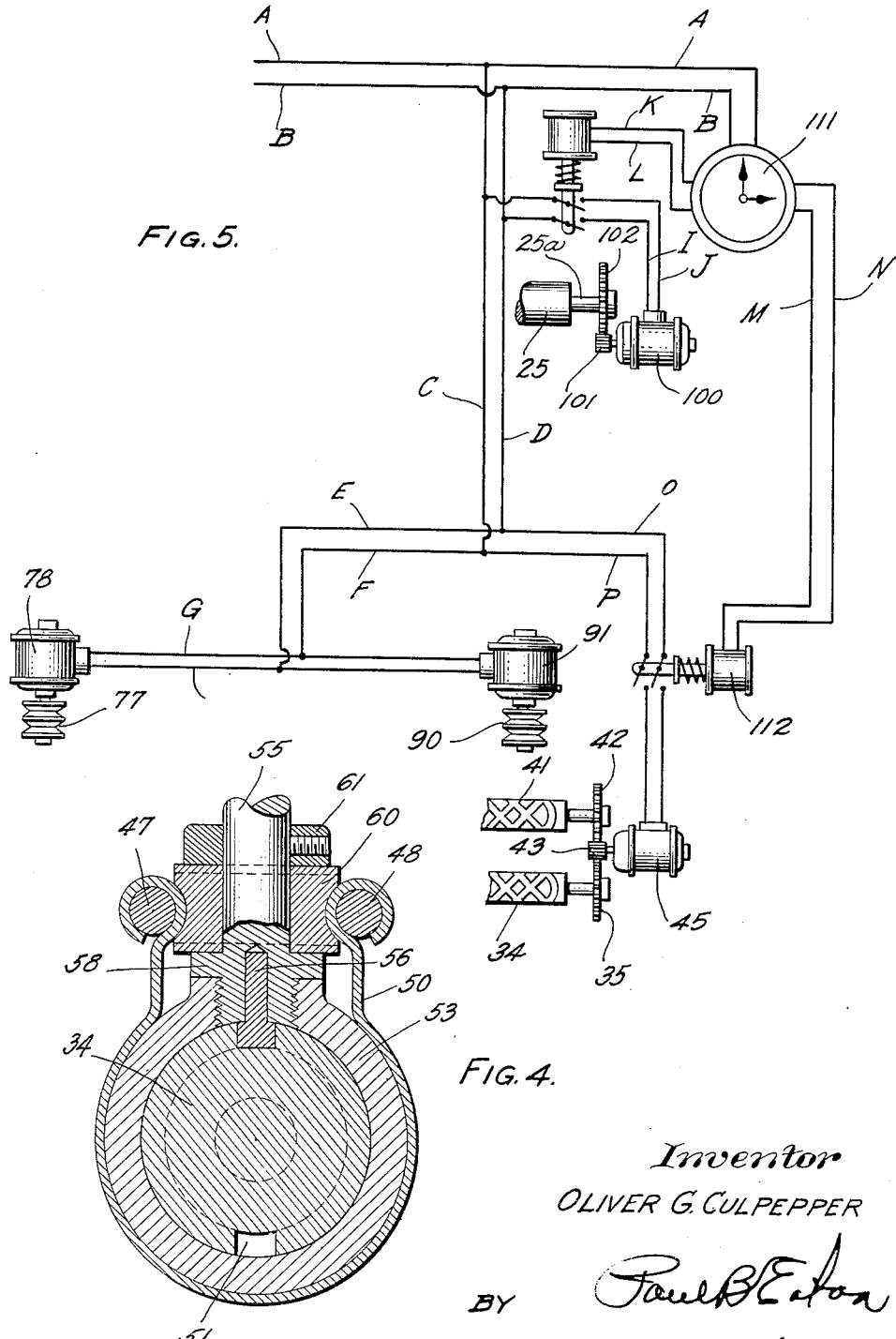

July 25, 1950           O. G. CULPEPPER           2,516,680
APPARATUS FOR REMOVING IMPURITIES FROM AIR
Filed May 11, 1945                         6 Sheets-Sheet 5
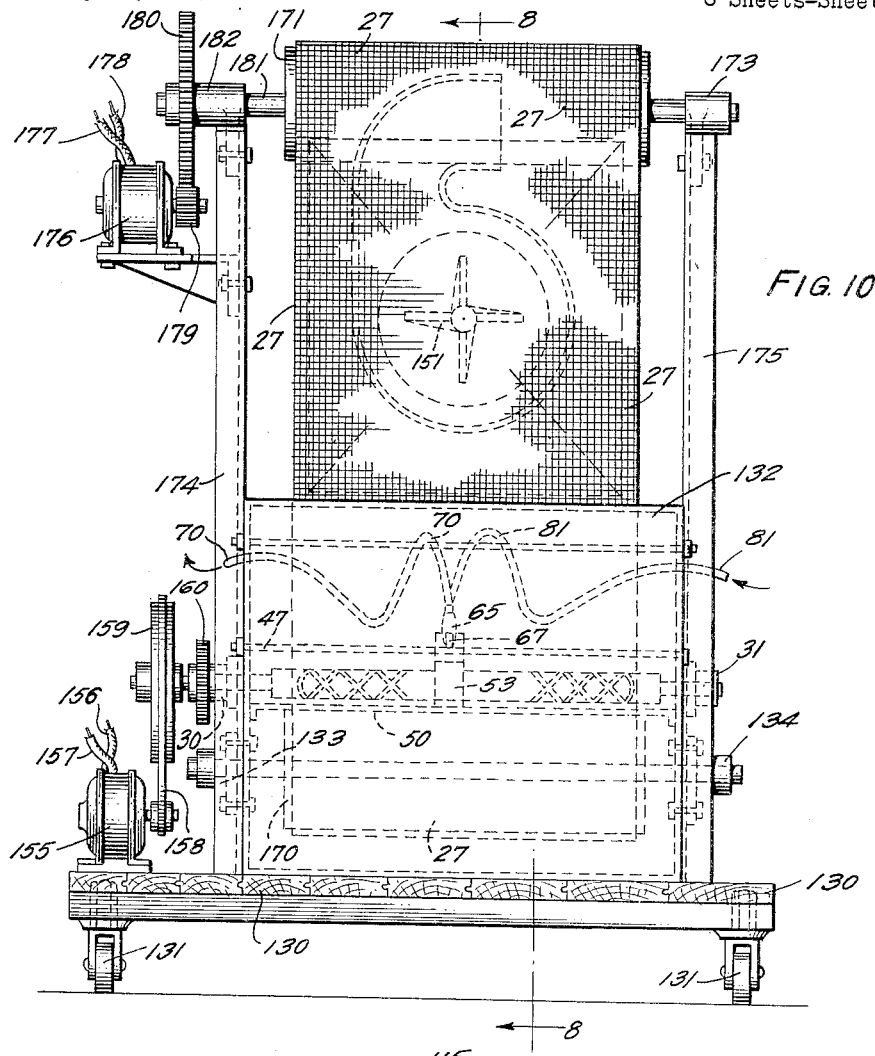
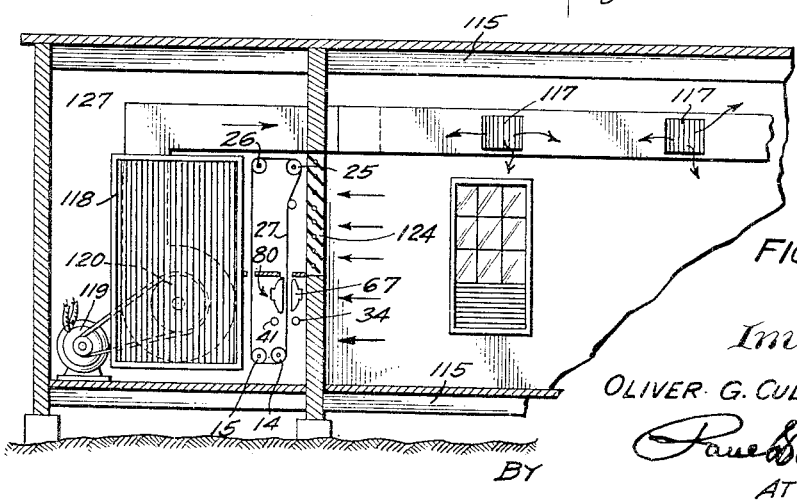
Inventor
OLIVER G. CULPEPPER
BY
ATTORNEY July 25, 1950
O. G. CULPEPPER
2,516,680
APPARATUS FOR REMOVING IMPURITIES FROM AIR
Filed May 11, 1945
6 Sheets-Sheet 6
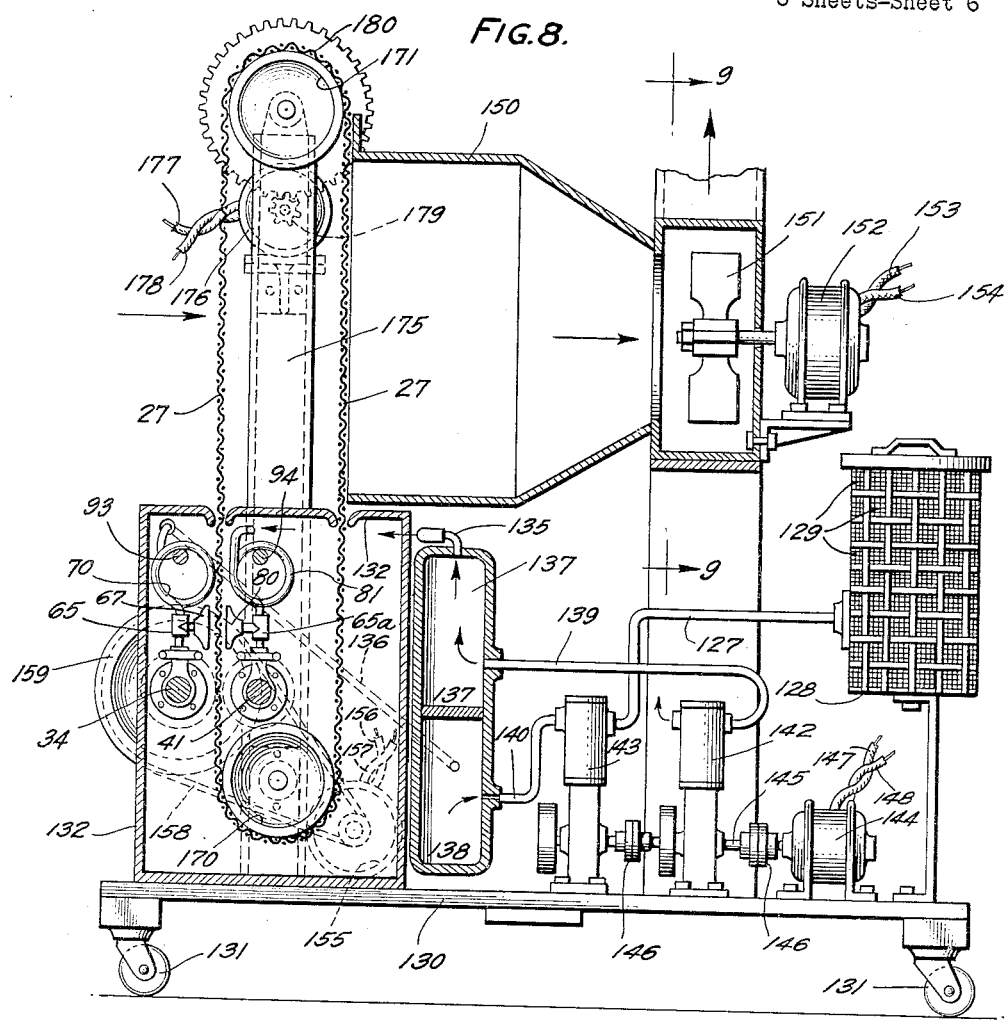
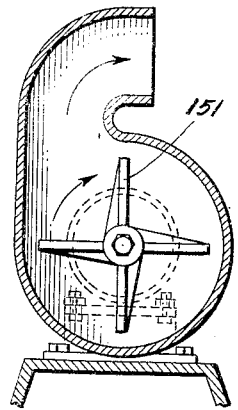
Inventor
OLIVER G. CULPEPPER
BY Paul B Eaton
ATTORNEY Patented July 25, 1950

2,516,680

UNITED STATES PATENT OFFICE 2,516,680

APPARATUS FOR REMOVING IMPURITIES FROM AIR

Oliver G. Culpepper, Charlotte, N. C.

Application May 11, 1945, Serial No. 593,286

3 Claims. (Cl. 183—61)

This invention relates to method and means for removing lint and other foreign particles from air in a circulatory system in a building or for removing the lint and other impurities from air contained within a room or building.

It is an object of this invention to provide a screen disposed in an opening in a building whereby the circulatory system of the building will force air into the building and withdraw it from the building and in the wall of the building through which the air is withdrawn for recirculation into the building a suitable screen is disposed through which the air is adapted to pass to remove lint and other foreign particles from the air, said apparatus comprising in addition blower and suction nozzles adapted to traverse the screen for removing the collected lint therefrom, the screen being adapted to be intermittently moved in step by step relation while the nozzles intermittently move transversely of the screen while the screen is in stationary position for removing the lint from a section of the screen as the nozzles travel transversely of the screen, together with automatic means for intermittently moving the screen and the nozzles alternately.

It is another object of this invention to provide a portable apparatus having a screen and adapted to be positioned within a building or a room with means for drawing the air from the room through the screen and discharging it again into the room together with suction and blower nozzles adapted to traverse the screen for removing the lint collected on the screen together with suitable means for catching the lint after it is removed by the nozzles from the screen.

Some of the objects of the invention having been stated, other objects will appear as the description proceeds when taken in connection with the accompanying drawings in which:

Figure 4 is a vertical sectional view taken substantially along the line 4—4 in Figure 3;

Figure 5 is a wiring diagram of the apparatus;

Figure 7 is a vertical sectional view taken substantially along the line 7—7 in Figure 6, but showing the screen in schematic form and omitting some of the parts;

Figure 8 is a vertical sectional view through a portable apparatus substantially along the line 8—8 in Figure 10;

Figure 9 is a vertical sectional view taken substantially along the line 9—9 in Figure 8;

Figure 10 is a front elevation of the apparatus shown in Figure 8 and looking from the left hand side of the apparatus in Figure 8.

Figure 1:
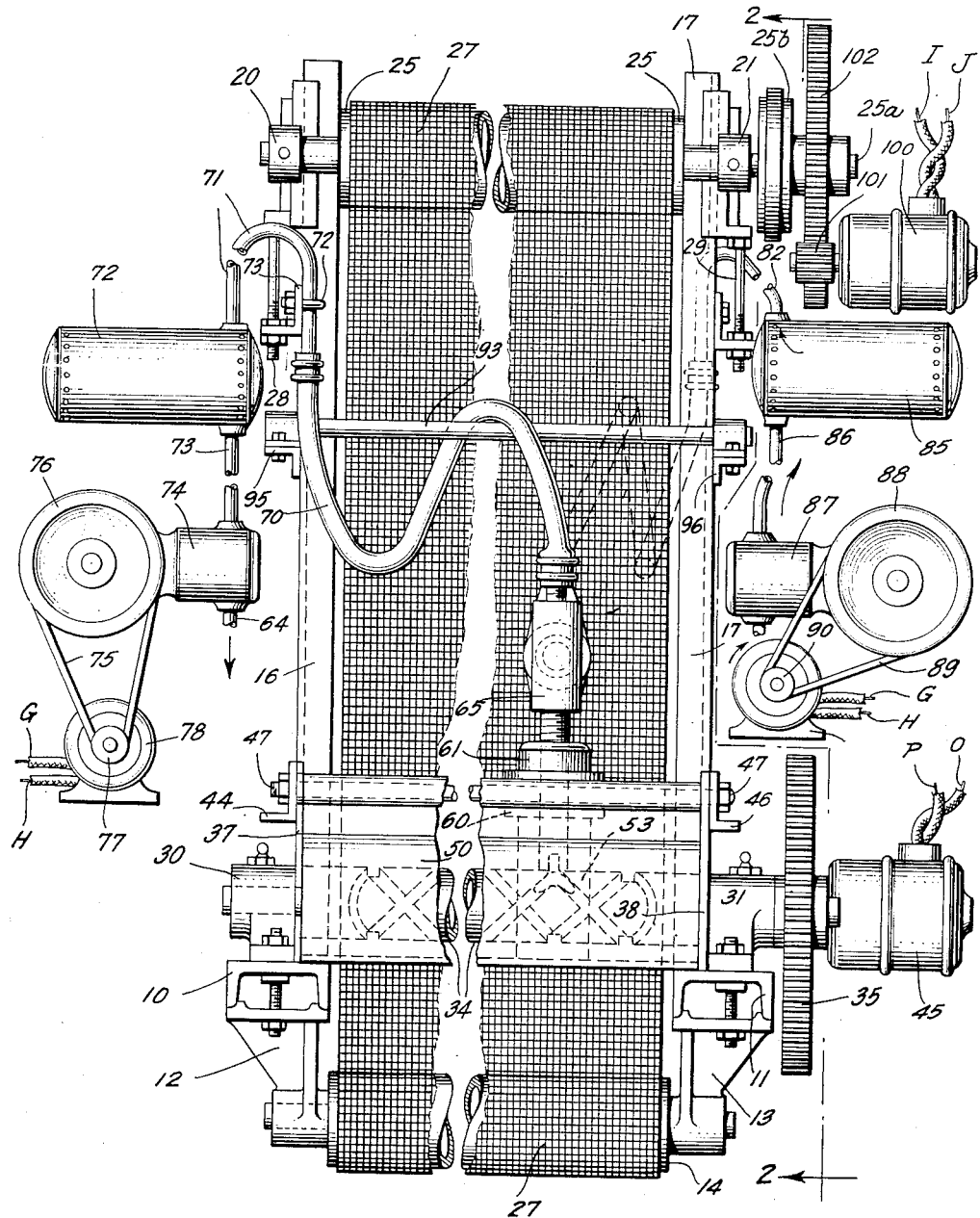
Figure 1 is a front elevation of the apparatus disassociated from the opening in which it would be positioned.

Referring more specifically to the drawings the numerals 10 and 11 indicate lower horizontal channel members which have secured to their lower surfaces bearing members 12 and 13 in which rollers 14 and 15 are rotatably mounted. Mounted on the upper side of the channel members 10 and 11 are upright posts 16 and 17 and on the upper ends of these uprights 16 and 17 are mounted bearing brackets 20 and 21 each of these brackets having a vertically disposed slot 22 therein in which a bolt 23 is mounted, said bolt being secured in the uprights 16 and 17 respectively so that the brackets 21 and 22 can be adjusted vertically by means of bolts 28 and 29. The bearing brackets 20 and 21 have rotatably mounted therein rollers 25 and 26. The rollers 25 and 26 and rollers 14 and 15 have mounted thereon an endless screen 27. This screen 27 is adapted to be disposed in a suitable air passageway to be presently described, for removing lint and other impurities from the air passing through the screen.

The channel bars 10 and 11 have mounted thereon bearing members 30, 31, 32 and 33. In bearings 30 and 31 there is mounted for rotation a traverse screw 34 which has fixed on one end thereof a gear 35. Also rising upwardly from the channel members 10 and 11 are plate members 37, 38, 39 and 40 which are rotatably penetrated by the bearing end portions of the traverse screw 34 and a second traverse screw 41. The traverse screw 41 is similar in all respects to traverse screw 34 and has a gear 42 on one end thereof. The two gears 35 and 42 are driven by means of an intermediate pinion 43 fixed on the shaft of a suitable electric motor 45. Motor 45 is a reduction gear motor and thus gives a much slower speed to the traverse rollers 34 and 41 than would be the case of a conventional electric motor.

The plates 37 and 38 have secured therein suitable elongated rods 47 and 48 around which is curled the upper edges of a casing 50 which encircles the traverse screw 34. The rods 47 and 48 penetrate angle iron brackets 44 and 46, said brackets being secured to uprights 16 and 17 respectively. The traverse screw 34 has suitable traversing grooves 51 and 52 therein.

Surrounding the traverse screw 34 is a ring or collar 53 which has threadably secured there at the lower end of a stud 55, said stud having a dog 56 turnably mounted in its lower end for fitting loosely into and traversing the grooves 51 and 52. This member 56 is a conventional dog such as used in traversing screws of this type. The stud 55 has a shoulder 58 thereon and mounted above the shoulder is a suitable grooved roller 60 which is rotatably mounted on the stud 55. A suitable collar 61 is adjustably secured on the stud 55 for rotatably confining the roller 60 on the stud. This roller 60 guides the nozzle mechanism to be presently described, back and forth along the traversing screw 34 in its back and forth movement.

The stud 55 is threaded at its upper end with a standard pipe thread and receives a suitable T 65 which has a nipple 66 secured thereto and to the other end of which is secured an air-suction nozzle 67 which is adapted to travel in close proximity to the screen 27. Connected to the T 65 also is a flexible hose 70 which extends upwardly and is connected to a suitable pipe 71 held by a suitable U-bolt 72 in an angle bar 73 secured to the upright 16. Pipe 71 leads to a suitable vacuum chamber 69 which is connected by a pipe 68 to a reversed pressure or suction pump 74 driven by a V-belt 75 mounted on a pulley 76 and also mounted on a pulley 77 on electric motor 78. Suction pump has an exhaust pipe 64 which is led to the exterior of the building.

Surrounding the traversing screw 41 is the same structure as previously described for the traverse screw 34 and like reference characters will apply with the prime notation added as the structure is identical except that the nozzle carried thereby is a blowing nozzle and not a suction nozzle. For purposes of description this nozzle will be given reference character 80 which is mounted in the same manner as described for nozzle 67. Suitably connected to nozzle 80 as previously described for nozzle 67 is a suitable flexible pipe 81 which is connected to a pipe 82 secured by a U-bolt 83 in a bracket 79. A pressure pipe 82 leads to a compression tank 85 and a pipe 86 leads from compression tank 85 to a compressor 87 which is driven by means of the pulley 88 having a V-belt 89 thereon mounted on a pulley 90 on electric motor 91 suitably supported. The compressor 87 is conventional and has an intake pipe 63.

The flexible pipes 70 and 81 in order to traverse a wide area of screen which may be very much wider than that shown in the drawings, is coiled several times around suitable pipes 93 and 94 whose ends are supported by angle irons 95 and 96 mounted on the uprights 16 and 17. The screen 27 is suitably guided by a roller 97 suitably mounted in bearings 98.

The rollers 25 and 26 are driven by an electric gear motor 100 having a pinion 101 on its shaft extending therefrom, which meshes with the gear 102 mounted on an extension 25a of roller 25. The extension 25a also has a V-pulley 25b mounted thereon and the roller 26 has an extension bearing portion 26a on which a V-pulley 26b is mounted and a V-belt 103 is mounted on both of these V-pulleys whereby both of the rollers 25 and 26 will be driven in unison and in the same direction.

A suitable source of electric current is led to the apparatus by electric wires A and B. Branch wires C and D lead to wires E and F and wires E and F are connected to wires G and H which are connected to the two motors 78 and 90 which are continuously operated for operating the suction and compression apparatus. Wires I and J branch off from wires C and D and pass through a suitable solenoid switch 110 in the wires I and J and these wires I and J after passing the solenoid switch 110 lead to the electric gear motor 100. Wires A and B also lead to a suitable time clock 111 which is conventional and has suitable trans- forming mechanism therein to send a low voltage through wires K and L to the coil of solenoid switch 110. Wires M and N lead also from the time switch 111 to a solenoid switch mechanism 112 located in wires O and P leading through the solenoid switch mechanism 112 to electric gear motor 45.

It is thus seen that when the time switch mechanism is in one position for a definite number of minutes or seconds the solenoid switch 110 will be energized to close the circuit of wires I and J to operate electric motor 100 for a predetermined length of time to advance the screen the width of the nozzles after the nozzles have made one sweep laterally across the screen. Then this current is automatically cut off and is turned onto wires M and N to energize solenoid switch 112 for a predetermined length of time which will energize electric motor 45 which operates the traversing screws 34 and 41 for a length of time sufficient to cause the nozzles 67 and 80 to traverse to the other side of the screen and then this solenoid switch 112 is automatically de-energized and switch 110 is again energized and the cycle is performed over and over again.

Figure 6:
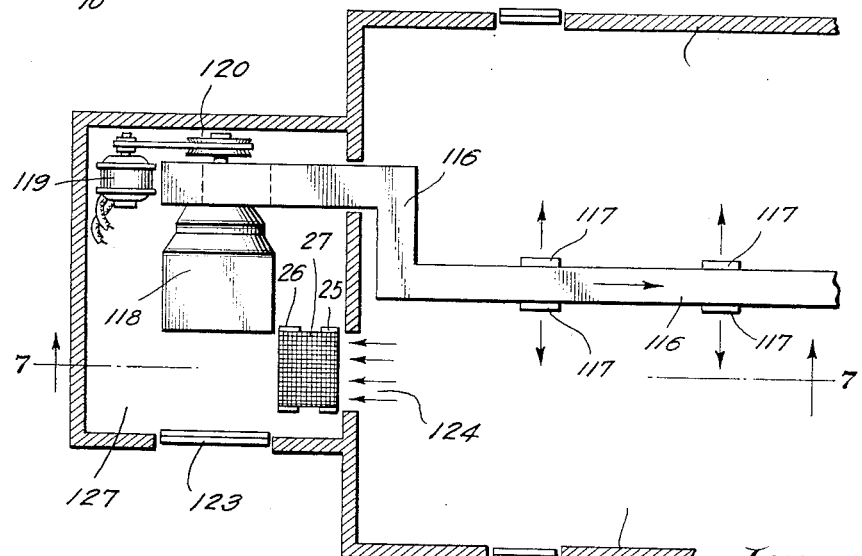
Figure 6 is a horizontal sectional view through a building and an associated blower room and showing the apparatus installed.

In Figures 6 and 7 one manner of installing the apparatus is shown wherein a suitable building or enclosure 115 such as a cotton mill has an air inlet duct 116 through which air is forced through outlets 117 into the interior of the mill. This is forced by a blower fan 118 driven by a suitable electric motor 119 through the medium of a V-pulley 120. This is a conventional blower fan and need not be further described. This fan is located in an adjacent room 122 on the exterior of the building. This room may have a suitable automatically operated set of vanes 123 for allowing a certain amount of fresh air to be taken into the system from time to time, all of which is conventional.

An opening 124 is provided between the room 123 and the room 115 whereby the air which is forced into the room is drawn back through the opening 124. It is in this opening that the above described apparatus is adapted to be disposed and operates as above described.

In Figures 8, 9, and 10 a modified form of the apparatus is shown. Like reference characters will apply to like parts and only the new features will be described. This is a portable apparatus which is adapted to be placed anywhere in a mill for cleaning the air especially where the mill is not equipped with a ventilating system as shown in Figures 6 and 7.

The portable apparatus comprises a wheeled framework 130 having a plurality of wheels 131 on which the apparatus is mounted. This framework 130 has a suitable casing 132 in which traversing screws which are identical to the ones previously described are mounted and bear like reference characters. The nozzles also are identical and the nozzle structure and the coiled hose associated therewith with the exception that the rods 93 and 94 are supported in the ends of the casing 131 instead of by brackets 95 and 96 as previously described.

The pipes 70 and 81, as previously described in the present instance instead of being connected to the pipes 71 and 82, are connected to pipes 135 and 136 respectively which lead to vacuum and compression chambers respectively 137 and 138 and pipes 139 and 140 respectively lead to suction and compression pumps 142 and 143 respectively, driven by a single electric motor 144 through means of shafting 145 and a plurality of couplings 146. A pair of suitable electric wires 147 and 148 are connected to the motor. Leading from compressor pump 143 is a pipe 127 which is connected to a woven wire container 128 which has therein a finely woven fabric liner 129 adapted to retain the lint forced through pipe 127.

In order to induce the flow of air through the screen 27 in this portable form, the conduit 150 is provided, having a blower fan 151 therein driven by a motor 152 connected by wires 153 and 154 to a suitable drop cord as well as wires 147 and 148. These motors 144 and 152 run continuously. The traversing screws in this portable apparatus are driven by means of a suitable electric motor 155 connected to a suitable source of electric current by means of wires 156 and 157 and a V-belt connects the motor and a V-pulley 159 on one of the shafts of the traversing screws. These traversing screws are connected together by pinions 160 and 161 although this will drive the two traversing screws in opposite directions, nevertheless, due to their equal reverse grooved construction the nozzles will travel along with each other. In the portable form instead of having upper and lower double rollers as previously described, single rollers 170 and 171 are mounted into the bearings 172 and 173 on the upper ends of frame members 174 and 175 and in bearings 133 and 134 at lower end. The upper roller 171 is driven by a suitable electric motor 176 through electrical wires 177 and 178 and a pinion 179 on its shaft engages a gear 180 on extension shaft 181 of roller 171 which imparts movement to the screen. The operation of the screen and the traversing screws intermittently is the same as previously described though not shown in this portable apparatus. The wiring diagram and time switch which has been described for the stationary mechanism is also employed on this portable apparatus as a suitable drop cord will convey current to the portable apparatus.

Figure 2:
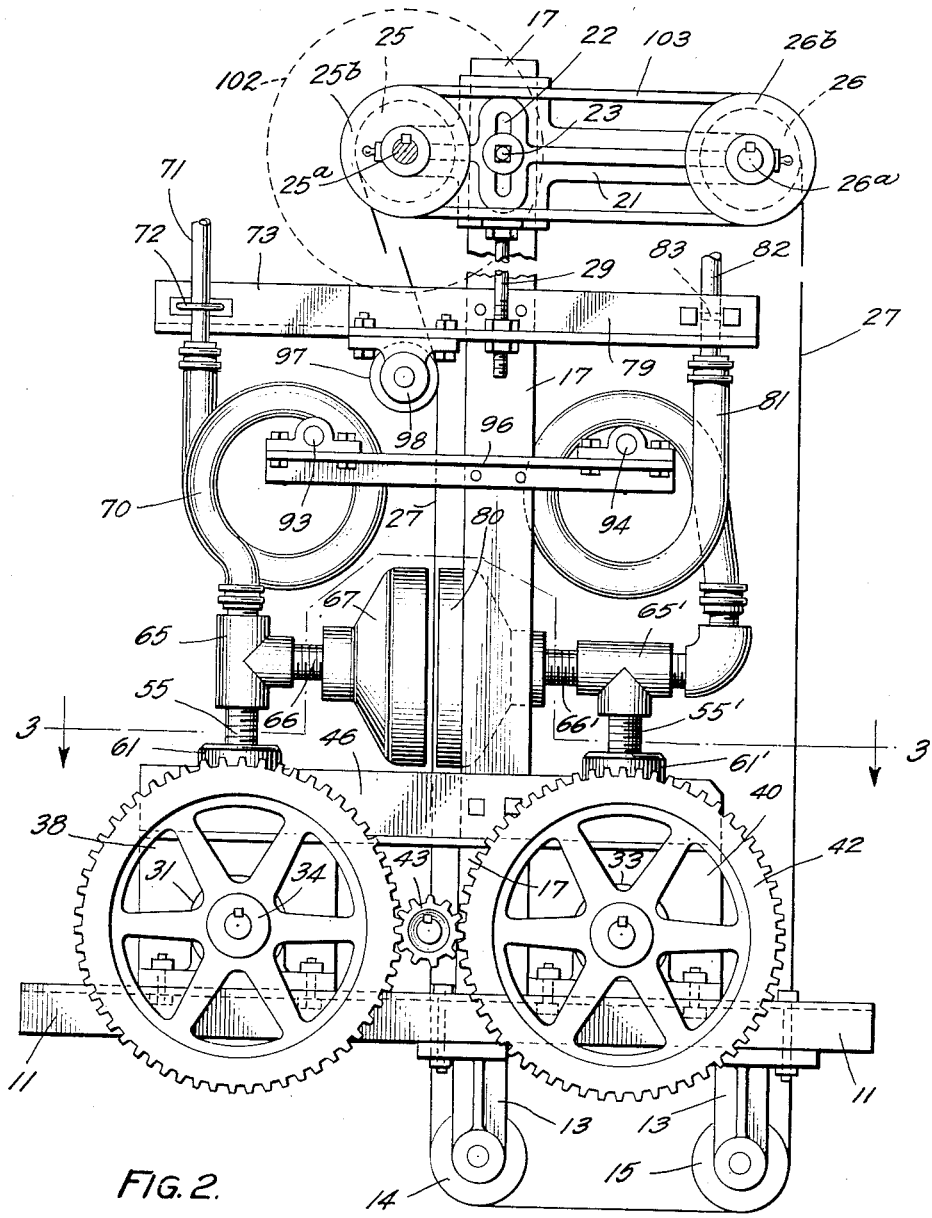
Figure 2 is a vertical view partly in section and taken along the line 2—2 in Figure 1.
Figure 3:
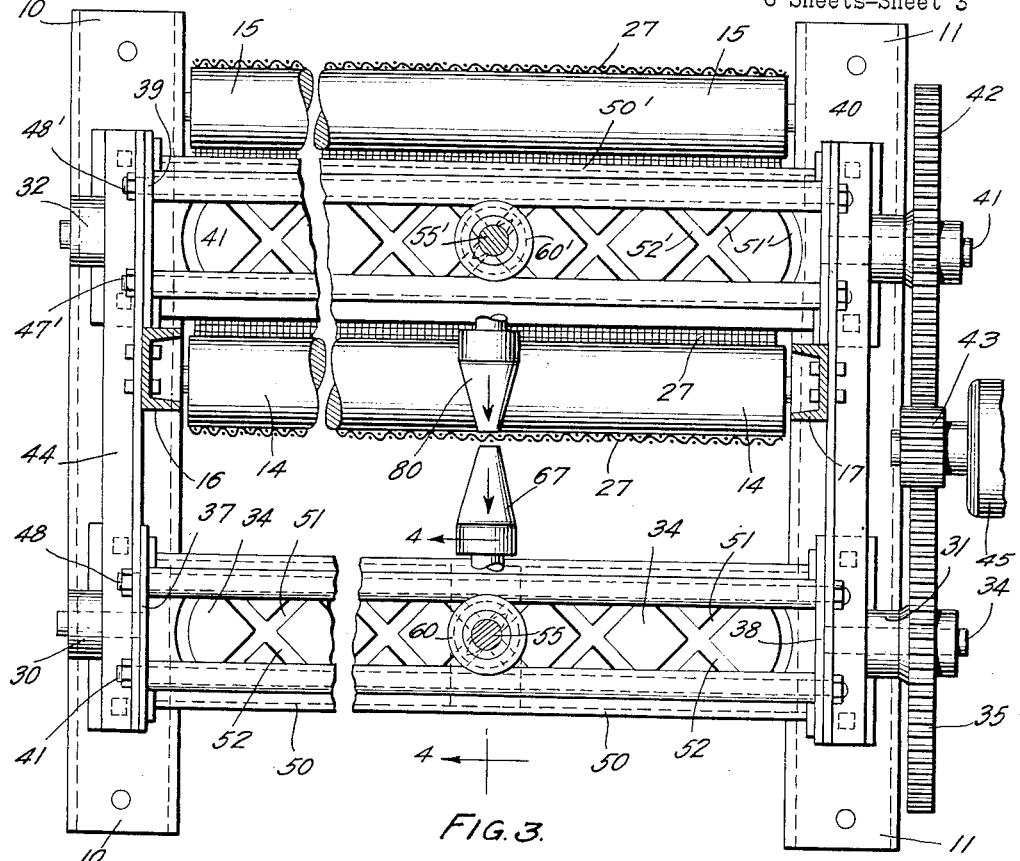
Figure 3 is a transverse sectional view taken substantially along the line 3—3 in Figure 2.

In Figures 8 and 10 it is to be noted that the nozzles sweep the screen at a point in a separate compartment below the air stream. This is true in the form shown in Figures 1, 2, 3, 6, and 7. It will be noted in Figure 2 that there is a break line near the top of the drawing which indicates that the top rollers 25 and 26 would be considerably more elevated than shown in the drawings so that the lower portion of apparatus, including that portion of the screen which is traversed by the nozzles, would not be in the air stream passing through the screen. It is also to be noted in Figure 7 that the opening 124 does not extend down far enough to allow the air stream to sweep that portion of the screen which is being traversed by the nozzles.

In the drawings and specification, there has been set forth a preferred embodiment of the invention, and although specific terms are employed, they are used in a generic and descriptive sense only, and not for purposes of limitation, the scope of the invention being defined in the claims.

I claim:

1. Apparatus for removing lint and other foreign particles from a screen through which air is being forced comprising a blower nozzle mounted on one side of the screen and a suction nozzle mounted on the other side of the screen, the two nozzles being mounted in axial alinement with each other, means for forcing air through the blower nozzle and through the screen and means for creating a suction in the suction nozzle to withdraw lint from the screen, means for moving the nozzles together across the screen from one side to the other to remove the lint therefrom and means for intermittently advancing the screen a distance equal to the width of the nozzles after the nozzles have passed transversely across the screen and before the nozzles move in the reverse direction across the screen.

2. Apparatus for removing lint and other foreign particles from a screen through which air has been forced comprising means for imparting intermittent movement to the screen, a pair of nozzles disposed on opposed sides of the screen, means for forcing air through one of the nozzles and against the screen, means for creating a partial vacuum in the other nozzle, the two nozzles being disposed in the same vertical and horizontal planes, means for traversing the nozzles simultaneously back and forth across the screen and control means for energizing the means for moving the screen and de-energizing the means for moving the nozzles while the screen is moving and also for moving the nozzles back across the screen while the means for moving the screen are de-energized.

3. Apparatus for removing lint and other foreign particles from the air in a room, comprising an opening through which the air is adapted to pass, means for forcing the air through the opening, a screen disposed in said opening and through which the air is adapted to pass, a pair of nozzles mounted on opposed sides of the screen, said nozzles being opposed to each other on the opposed sides of the screen and being in the same horizontal and vertical plane, means for creating a draft in one nozzle, means for creating a suction in the other nozzle, means for traversing the nozzles together laterally of the screen while the screen is motionless, means for imparting motion to the screen to move it a predetermined amount, and control means for the nozzle moving means and the screen moving means for imparting motion to the screen and causing the nozzles to remain stationary while the screen is moved and for causing the screen to be stationary while the nozzles are traversed across the screen.

OLIVER G. CULPEPPER.

REFERENCES CITED

The following references are of record in the file of this patent:

UNITED STATES PATENTS

| Number | Name | Date |
| --- | --- | --- |
| 849,061 | Garner | Apr. 2, 1907 |
| 996,860 | Kestner | July 4, 1911 |
| 1,252,472 | Miles | Jan. 8, 1918 |
| 1,375,663 | Ainsworth | Apr. 26, 1921 |
| 1,638,067 | Szekely | Aug. 9, 1927 |
| 1,695,784 | Sternberg | Dec. 18, 1928 |
| 1,837,836 | Powell | Dec. 22, 1928 |
| 1,913,885 | Jordahl | June 13, 1933 |
| 1,997,826 | Krick | Apr. 16, 1935 |
| 2,109,512 | Stacey, Jr. | Mar. 1, 1938 |
| 2,198,449 | Atkins | Apr. 23, 1940 |
| 2,289,700 | Eiben | July 14, 1942 |
| 2,311,374 | Farmer et al. | Feb. 16, 1943 |